(12) United States Patent
Ong et al.

(10) Patent No.: US 6,808,661 B2
(45) Date of Patent: Oct. 26, 2004

(54) METHOD FOR ENCAPSULATING LEADFRAME-MOUNTED INTEGRATED CIRCUITS

(75) Inventors: See Yap Ong, Singapore (SG); Kock Hien Wee, Singapore (SG); Shu Chuen Ho, Singapore (SG); Teng Hock Kuah, Singapore (SG); Jian Wu, Singapore (SG)

(73) Assignee: ASM Technology Singapore PTE Ltd., Singapore (SG)

( * ) Notice: Subject to any disclaimer, the term of this patent is extended or adjusted under 35 U.S.C. 154(b) by 221 days.

(21) Appl. No.: 10/013,079

(22) Filed: Dec. 11, 2001

(65) Prior Publication Data

US 2003/0107142 A1 Jun. 12, 2003

(51) Int. Cl.$^7$ .......................... B29C 31/08; B29C 33/72; B29C 45/02; B29C 45/14
(52) U.S. Cl. .................... 264/39; 264/102; 264/272.15; 264/272.17; 264/328.5
(58) Field of Search ...................... 264/39, 102, 272.11, 264/272.15, 272.17, 328.4, 328.5; 425/116, 126.1, 145, 225, 226, 544, 546

(56) References Cited

U.S. PATENT DOCUMENTS

| | | | | | |
|---|---|---|---|---|---|
| 4,890,780 | A | * | 1/1990 | Mimata et al. ............... 228/4.5 |
| 4,997,355 | A | * | 3/1991 | Yamauchi et al. ........... 425/116 |
| 5,015,425 | A | * | 5/1991 | Mimata et al. ................ 264/39 |
| 5,366,368 | A | * | 11/1994 | Jang ............................ 425/544 |
| 5,656,305 | A | * | 8/1997 | Venrooij ...................... 425/145 |
| 5,750,059 | A | * | 5/1998 | Bandoh ........................ 264/39 |
| 5,770,128 | A | * | 6/1998 | Kobayashi et al. ............ 264/39 |
| 6,461,558 | B1 | * | 10/2002 | Berghoff ................ 264/272.17 |
| 6,644,238 | B2 | * | 11/2003 | Watts et al. ................... 118/45 |

* cited by examiner

*Primary Examiner*—Angela Ortiz
(74) *Attorney, Agent, or Firm*—Ostrolenk, Faber, Gerb & Soffen, LLP

(57) ABSTRACT

A system is proposed for encapsulating in plastics material leadframe items comprising an IC wired to a leadframe. Dust of the plastics material is removed from the encapsulation system, and in particular from those items where dust principally accumulates, such as the surfaces of the molds. To reduce the level of dust which enters the molding region, the path along which the leadframe items are conveyed to the molding region is closed at times when the leadframe items are not being transported there. Additionally, the leadframe items are conveyed to the molding region under a cover including a vacuum source, so that the dust is continually sucked away from them.

8 Claims, 5 Drawing Sheets

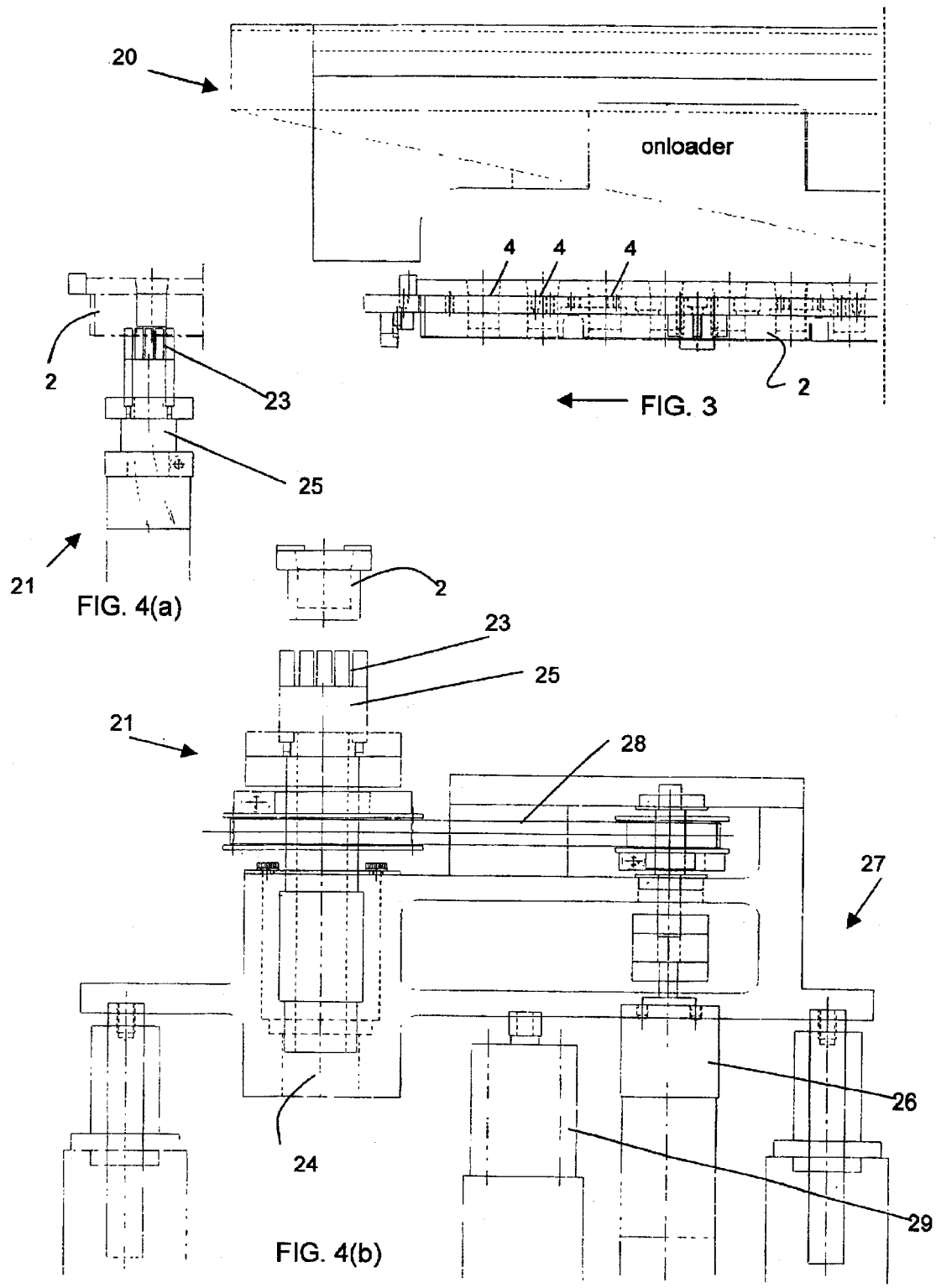

METHOD FOR ENCAPSULATING
LEADFRAME-MOUNTED INTEGRATED
CIRCUITS

FIELD OF THE INVENTION

The present invention relates to methods for encapsulating leadframe items which each have a leadframe and an IC wired to it. The invention further relates to leadframe encapsulation systems employing the methods.

BACKGROUND OF THE INVENTION

Increasingly, plastics materials such as epoxy-moulding compounds (EMC) are used for encapsulating leadframe items to form IC packages. The leadframe item is located in a mold, a pellet of plastics material is provided for the mold and the plastics material is molded around the leadframe item, in particular such that the mires become encased in the plastic material.

The use of EMC and the trend towards environmentally friendly compound formulation has given rise to increased levels of pellet dust, leading to various problems including increased mold flash after the encapsulation and disadvantageous movement of the wires ("leads").

SUMMARY OF THE INVENTION

The present invention aims to provide a new and useful method for encapsulating leadframe items.

The invention further aims to provide a new and useful system for encapsulating leadframe items.

In general terms, the present invention proposes that dust of the plastics material is removed from the encapsulation system, and in particular from those items where dust principally accumulates and/or where dust is most disadvantageous. The dust is typically brushed off, or transported out of the system by an air flow, e.g. to a filter.

Typically, these items are the dispenser which dispenses plastics material pellets into the mold, the holder which holds pellets before they enter the dispenser, the conveyor which transports the leadframe items into the molding region, and the molds themselves.

Furthermore, to reduce the level of dust which enters the molding region, the present invention proposes that the path along which the leadframe items are conveyed to the molding region is closed at times when it is not required to convey leadframe items to the molding region.

Furthermore, the present invention proposes that leadframe items are conveyed to the molding region under a cover including a pressure source, so that the dust is continually sucked (or in some embodiments blown) away from the leadframe items.

The invention may be expressed as methods for encapsulating leadframe items which include the above cleaning concepts. Alternatively, the invention can be expressed as a leadframe encapsulation system which employs the methods.

BRIEF DESCRIPTION OF THE FIGURES

An embodiment of the invention will now be described for the sake of example only with reference to the following figures in which:

FIG. 3 is a view of the pellet dispenser in relation to the onloader which carries it in a known encapsulation system;

FIG. 4, which is composed of FIGS. 4(a) and 4(b), shows cleaning of the pellet dispenser by the embodiment;

DETAILED DESCRIPTION OF THE EMBODIMENT

Figure 1:
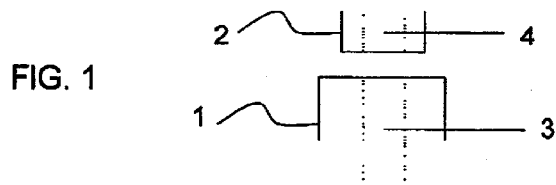
FIG. 1 is a view of a pellet holder and pellet dispenser in a known encapsulation system.

Referring firstly to FIG. 1, a side (horizontal) view of a part of a known encapsulation system is shown. Pellet holder 1 is for transmitting pellets of a plastics material such as EMC to a pellet dispenser 2. As discussed below, the pellet holder 1 is movable in a vertical direction towards or away from the pellet dispenser 2. It includes a number of holes 3 through which pellets of EMC are pushed into corresponding holes 4 in the pellet dispenser 2. Pellets are pushed from the holes 3 by rods (not shown) moving within the pellet holder 1. The rods rise to push the pellets into the holes 4 and then descend, but before the pellets fall out of the holes 4, a shutter plate (not shown) closes the lower end of the holes 4 so that the pellets are retained in the dispenser 2. During the process a significant amount of EMC dust is generated or released.

Figure 2A:
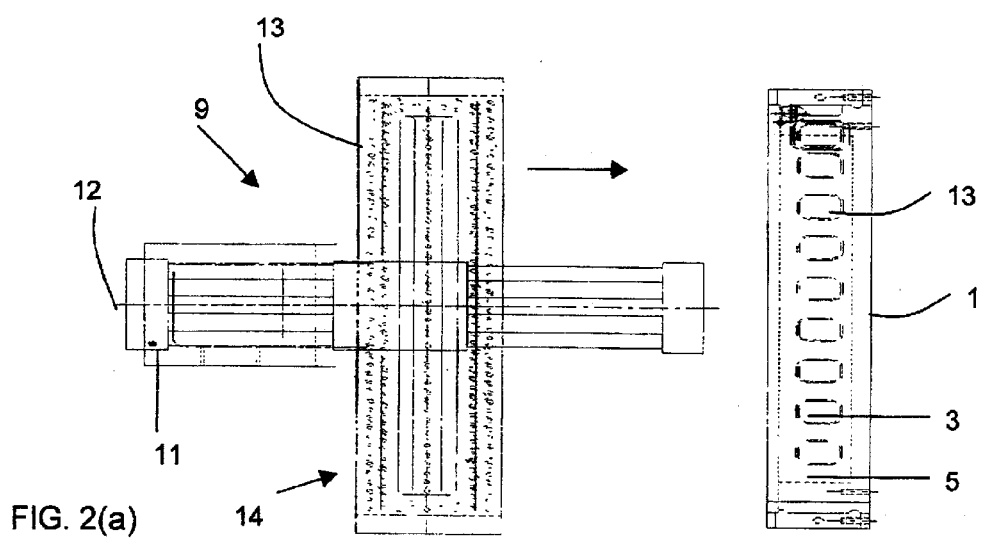
FIG. 2, which is composed of FIGS. 2(a) and 2(b), shows how in the embodiment the pellet holder is cleaned.
Figure 2B:
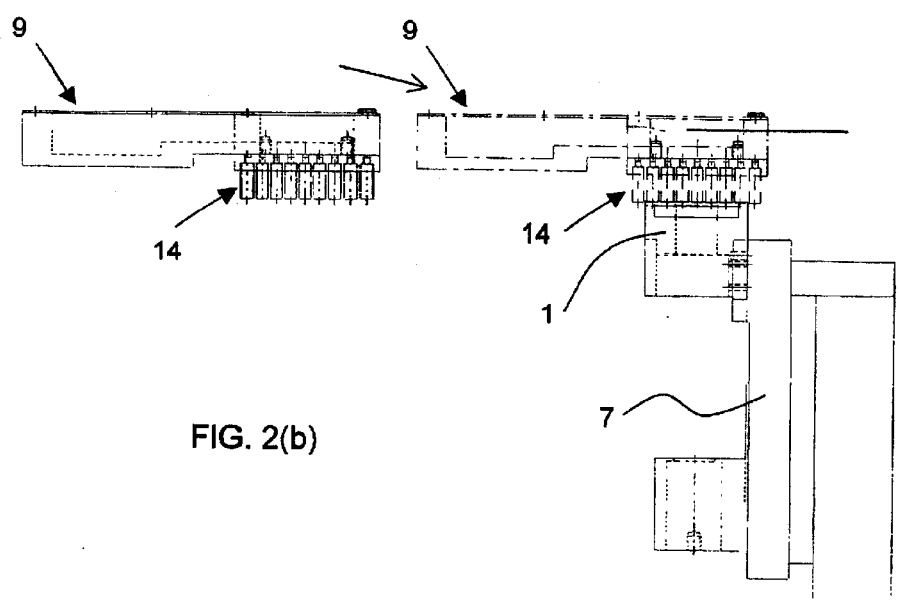

FIG. 2 shows two views of the pellet holder 1. FIG. 2(a) is a top view vertically downward. In FIG. 2(b) the pellet holder 1 is seen from the direction of FIG. 1, the "front" of the system. The pellet holder 1 is supported by an apparatus 7 arranged to reciprocate the pellet holder 1 in the vertical direction. Whereas in FIG. 1 the pellet holder 1 is raised to an upper position so as to contact the lower portion of the pellet dispenser 2, as shown in FIG. 2(b) the pellet holder 1 is in the lowered position.

FIG. 2(a) shows the shapes of the holes 3 in the upper surface 5 of the pellet holder 1. FIG. 2(a) also shows a cleaning device 9 for cleaning the pellet holder 1. The cleaning device 9 has an air cylinder 11 having a horizontal axis marked as 12 in FIG. 2(a). Below the air cylinder 11 is vertically downward facing surface 13 provided with bristles 14 constituting a brush. The downwardly directed bristles 14 are for brushing the upwardly facing surface 5 of the pellet holder 1. Before this can be achieved the cleaning device 9 is moved horizontally (to the right in FIGS. 2(a) and 2(b)) from a first position-on the left of FIG. 2(b), to the right into the other position shown in FIG. 2(b), where the bristles 14 of the brush contact the upper surface 5 of the pellet holder 1.

The cleaning device 9 includes an internal conduit 15 connected via the air cylinder 11 to a vacuum source. The conduit has an end near the bristles 14. Thus, the vacuum source 15 acts to remove dust from the surface 5 of the pellet holder 1, and also to remove any dust which has accumulated on the bristles 14 of the brush.

FIG. 3 shows how in a known encapsulation system the pellet dispenser 2 is supported in a fixed positional relationship to an onloader 20 which, as discussed below, has the function of transporting leadframe items to a molding region in which the packages are formed. FIG. 3 is a side view (i.e. from a horizontal direction but perpendicular to the view of FIG. 2(b)).

Referring to FIG. 4, the encapsulation system includes a further cleaning device 21 for cleaning the lower surface of the pellet dispenser 2. The cleaning device 21 includes a brush 23 which can be missed to contact the lower surface of the pellet dispenser 2 or lowered away from the lowest surface of the pellet dispenser 2. As with the cleaning device 9, an internal conduit 25 opening proximate the brush 23 leads to a vacuum source, so that dust from the surface of the pellet dispenser 2 is not retained on the brush 23 but removed from the system.

FIG. 4(b) shows the mechanism 27 for driving the cleaning device 21. The cleaning device 21 is arranged to rotate about a vertical axis 24 and is driven by a rotary motor 26, which is connected to the cleaning device 21 by a belt 28. The cleaning device 21 is raised to or lowered from the pellet dispenser 2 by a piston cylinder 29.

Figure 5:
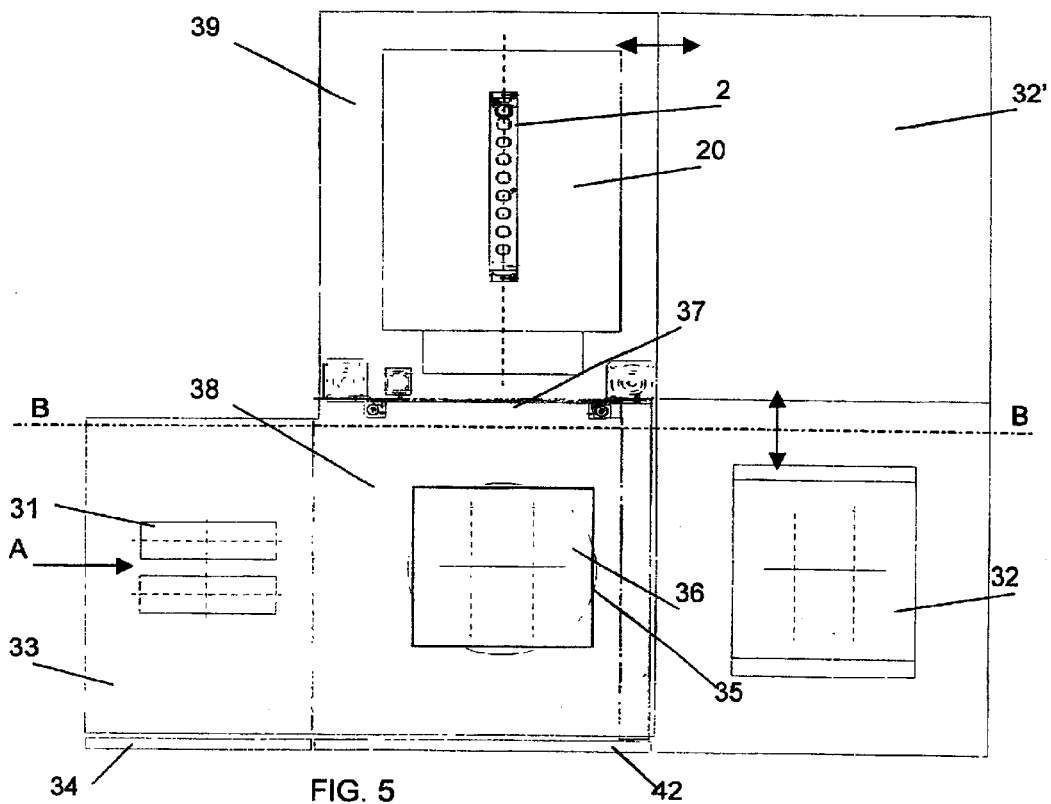
FIG. 5 illustrates the relative positions of a leadframe input region, turntable region, pellet input region and molding region, and conveyance of leadframe items to a molding region of the embodiment.

Turning to FIG. 5, an input mechanism is shown by which leadframe items 31 are brought into a molding region 32. The leadframe items are transported to a leadframe input region 33 in direction A, and a conveyor (not shown but of a conventional form) brings leadframe items 31 into turntable region 38 where there is located a turntable 35 which rotates in a horizontal plane (the plane of FIG. 5) to correctly orientate the leadframe items 31. The leadframe input region 33 and turntable region 38 may be accessed by operators via one or more front access doors 34, 42, that are normally closed during operation of the system. The front access doors 34, 42 may comprise swing-doors and may be pivotally arranged with the compartments housing the respective regions 33, 38, such that the front access doors 34, 42 are conveniently opened for access to the regions.

The onloader 20 carrying the pellet dispenser 2 is reciprocated by a mechanism (not shown) horizontally between a position at the top of FIG. 5 in the pellet loading region 39 and a second position marked as 36 in the turntable region 38. In this second position, the onloader 20 overlies the turntable 35 and picks up the leadframe items 31 located there. The turntable region 38 and pellet loading region 39 are separated by a door 37 which is opened when it is desired to move the onloader 20 over the turntable 35, or when it is desired to return the onloader 20 to the pellet loading region 39. From the pellet loading region 39, the onloader 20 transports the leadframe items 31 and pellets to region 32' and finally to molding region 32 utilizing guide tracks arranged in the respective regions 39, 32'.

Figure 6:
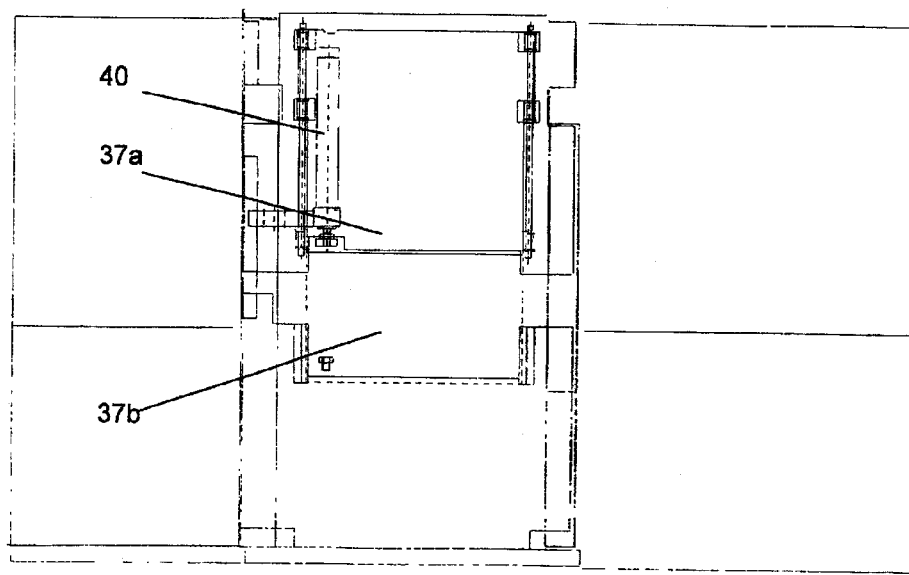
FIG. 6 illustrates motions of a door for closing the input module of the embodiment.

FIG. 6 is a front view of the arrangement of FIG. 5, looking from the bottom of FIG. 5 along section B—B. The upper and lower positions of the door 37 are marked respectively as 37a and 37b. A piston cylinder 40 with a vertical axis is provided for reciprocating the door 37 between these two positions.

Figure 7:
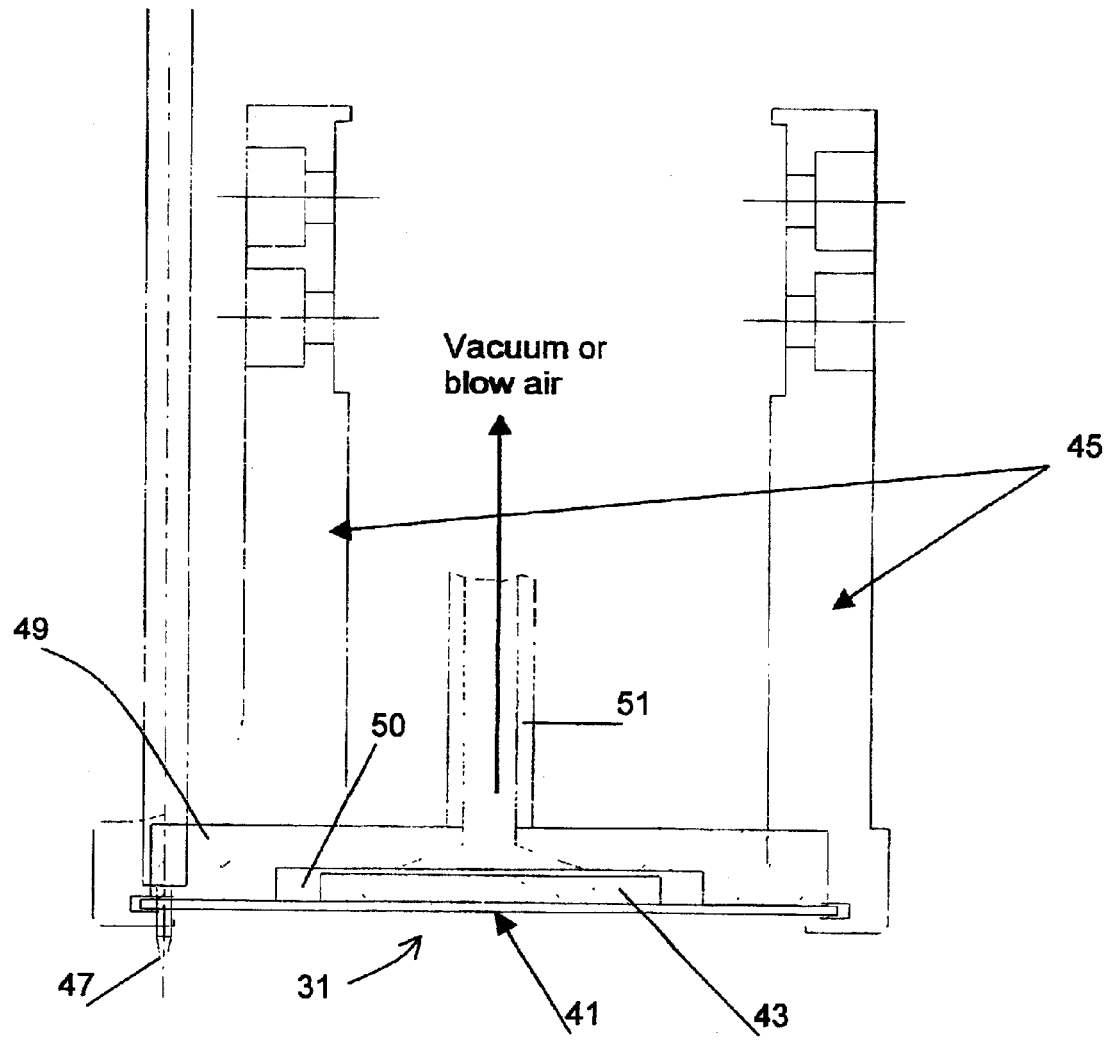
FIG. 7 illustrates transportation of leadframe items by the embodiment.

Turning to FIG. 7, the mechanism is shown by which a leadframe item 31 having a substrate 41 and a die 43 is transported by the onloader 20. The onloader 20 has fingers 45 for gripping the edges of the substrate 41 and the grip is ensured by a leadframe location pin 47 that locates a corresponding hole on the substrate 41 indicating its orientation. A cover 49 is provided having a recess 50 on its lower side for receiving the die 43, while the outer portion of the lower surface of the cover 49 presses against the upper surface of the substrate 41. A spring loaded mechanism (not shown) continuously urges the cover 49 against the substrate 41. The recess 50 in the cover 49 is in communication with a conduit 51 leading to a vacuum source. Thus a vacuum environment is maintained between the cover 49 and the substrate 41, and any dust particles are sucked towards a vacuum source. Note that an alternative to providing a vacuum source would be to connect the conduit 51 to an air source, so that it would continually blow air into the recess 50, and thus blow any dust out of the region 50. While this alternative is practicable providing that the air has a laminar flow, it is not preferred since the dust is merely displaced to other portions of the embodiment.

Figure 8:
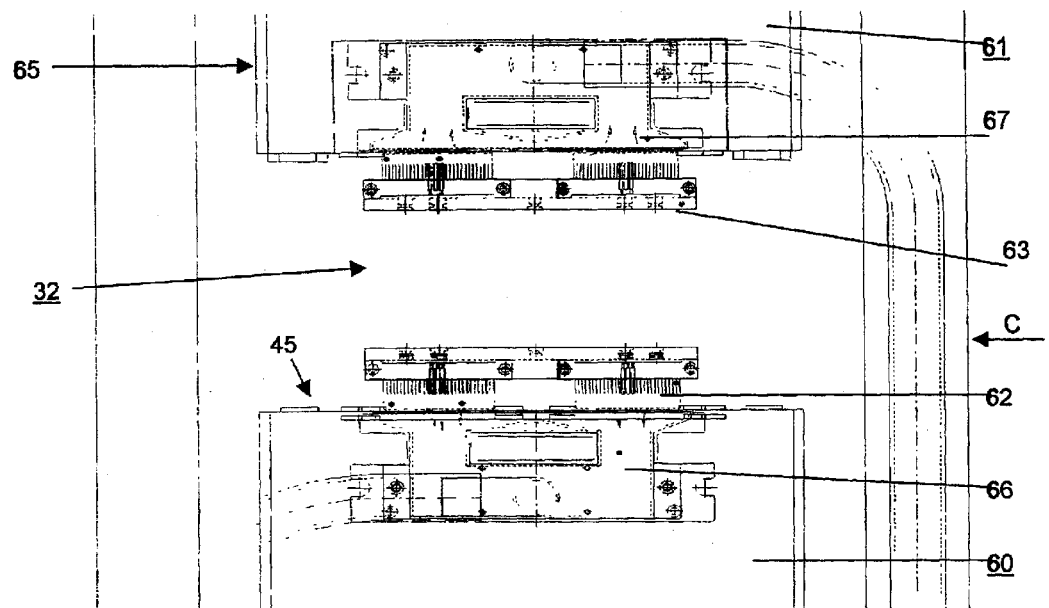
FIG. 8 illustrates vacuum cleaning of a mold brush in the embodiment.
Figure 9:
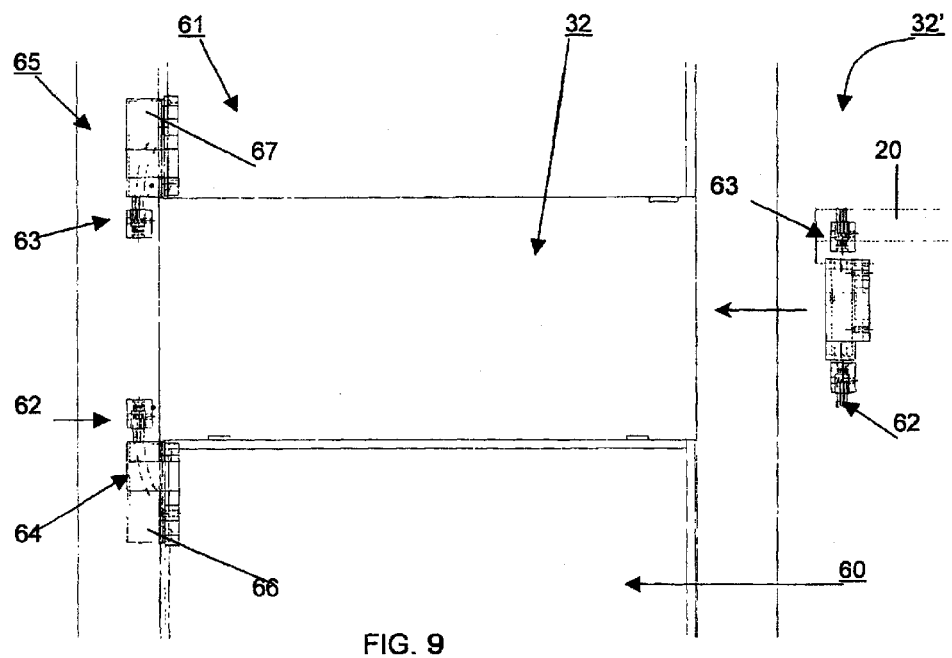
FIG. 9 is a view illustrating cleaning of molds by the mold brushes in the embodiment.

FIG. 8 is a view of the molding region 32 of the embodiment system from the front direction (i.e. parallel to FIG. 6), while FIG. 9 shows the same region from the side direction (i.e. direction C of FIG. 8). The molding region 32 includes a bottom mold 60 and a top mold 61. The onloader 20 is provided with mold brushes 62, 63 which respectively have brushes pointing downwards and upwards for respectively brushing the horizontal surfaces of the bottom mold 60 and the top mold 61.

When the onloader 20 is in the position shown in FIG. 9, the brushes 62, 63 are in the region 32' on the right of FIG. 9. In the location the brushes 62, 63 are in "normal" unextended position in which they are inward from the surfaces of the top and bottom molds 61, 60, but the brushes are then moved to an "extended" position in which the free ends of the brushes 62, 63 are in horizontal register with the horizontal surfaces of the respective molds 60, 61. As the onloader 20 moves to the left to be fully inside the region 32 so that the leadframe items are between the top and bottom molds 60, 61, the brushes 62, 63 brush the surfaces of the top and bottom molds 60, 61, and finally come fully into register with cleaning devices 64, 65 which are respectively fixed to the bottom and top molds 60, 61 at their position furthest from the region 32'. In FIG. 9, the brushes 62, 63 are shown again in this position, at the leftmost end of their travel.

The cleaning devices 64, 65 include respective vacuum channels 66, 67 leading to vacuum sources, and thus the insides of the cleaning devices 64, 65 are at low pressure. When the cleaning devices are close to the brushes 62, 63 they suck dust away from them and out of the system (e.g. to a filter).

When the onloader 20 once more moves back to the right, the brushes 62, 63 once more pass over and brush the surfaces of the bottom and top molds 60, 61 respectively.

The brushes 62, 63 and the cleaning devices 64, 65 reduce the amount of dust which remains on the mold surfaces when the molding is carried out. This in turn reduces the risk of flashes on the leads, or shifting of the leads during the encapsulation process.

Although a single embodiment of the invention has been described in detail here, many variations are possible as will be clear to a skilled reader. For example, not all of the various cleaning devices described above are used in all embodiments of the invention.

What is claimed is:

1. A method for encapsulating leadframe items each comprising an IC mounted on a leadframe, the method comprising:

loading pellets of plastics material from a pellet holder into a pellet dispenser;

conveying a leadframe item to a mold;

dispensing at least one pellet of plastics material from the pellet dispenser; and molding the dispensed plastics material around the leadframe;

removing dust of the plastics material from the pellet holder and from the pellet dispenser.

2. A method according to claim 1 in which the step of removing the plastics dust includes brushing the pellet holder and the pellet dispenser.

3. A method according to claim 1 in which the step of removing plastics dust includes applying a vacuum source to the pellet holder and the pellet dispenser.

4. A method for encapsulating leadframe items each comprising an IC mounted on a leadframe, the method comprising:

conveying one or more leadframe items to a mold;

dispensing at least one pellet of plastics material; and molding the dispensed plastics material around the leadframe;

wherein the leadframe is conveyed to the mold by a conveyor while exposed to a pressure source which is in communication with a cover of the conveyor whereby dust of the plastics material is removed from the leadframe.

5. A method according to claim 4 in which the pressure source is a vacuum source.

6. A method for encapsulating leadframe items each comprising an IC mounted on a leadframe, the method comprising:

displacing a door from a first position in which the door closes a molding region to a second position in which the door does not close the molding region, thereby opening a path to the molding region;

conveying one or more leadframe items along the path to a mold located in the molding region while the door is at the second position;

returning the door to the first position;

dispensing at least one pellet of plastics material; and molding the dispensed plastics material around the leadframe item.

7. A method for encapsulating leadframe items each comprising an IC mounted on a leadframe, the method comprising:

conveying one or more leadframe items to a mold;

dispensing at least one pellet of plastics material;

molding the dispensed plastics material around the leadframe;

applying a brush to at least one surface of the mold to remove dust of the plastics material from the mold, and thereafter, removing dust from the brush by applying a vacuum source to the brush at an end position traveled by the brush.

8. A method according to claim 1 in which the step of removing the plastics dust includes the steps of:

brushing the pellet holder and/or the pellet dispenser with a brush; and applying a vacuum source proximate to the brush to remove plastics dust therefrom.

* * * * *